United States Patent
Kim et al.

(10) Patent No.: US 10,355,779 B2
(45) Date of Patent: Jul. 16, 2019

(54) VIRTUAL OPTICAL NETWORK SERVICE WITH GUARANTEED AVAILABILITY

(71) Applicant: Fujitsu Limited, Kawasaki-shi, Kanagawa (JP)

(72) Inventors: Inwoong Kim, Allen, TX (US); Xi Wang, Murphy, TX (US); Martin Bouda, Plano, TX (US); Olga Vassilieva, Plano, TX (US); Qiong Zhang, Plano, TX (US); Paparao Palacharla, Richardson, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/714,420

(22) Filed: Sep. 25, 2017

(65) Prior Publication Data
US 2019/0097720 A1    Mar. 28, 2019

(51) Int. Cl.
| | |
|---|---|
| H04J 14/02 | (2006.01) |
| H04B 10/077 | (2013.01) |
| H04B 10/079 | (2013.01) |
| H04Q 11/00 | (2006.01) |

(52) U.S. Cl.
CPC ... *H04B 10/0775* (2013.01); *H04B 10/07953* (2013.01); *H04J 14/0227* (2013.01); *H04Q 11/0066* (2013.01); *H04Q 11/0067* (2013.01); *H04Q 2011/0073* (2013.01); *H04Q 2011/0084* (2013.01)

(58) Field of Classification Search
CPC .................................................. H04J 14/0227
See application file for complete search history.

(56) References Cited

U.S. PATENT DOCUMENTS

| | | | |
|---|---|---|---|
| 2003/0169998 A1* | 9/2003 | Premaratne | H04B 10/27 385/147 |
| 2004/0092281 A1* | 5/2004 | Burchfiel | H04B 7/0408 455/522 |
| 2004/0213565 A1* | 10/2004 | Kamalov | H04B 10/07953 398/26 |
| 2017/0310392 A1* | 10/2017 | Boertjes | H04B 10/07953 |

OTHER PUBLICATIONS

ITU-T Series G, Supplement 39: Optical system design and engineering considerations; Feb. 2016; https://www.itu.int/rec/T-REC-G.Sup39-201602-I; <retrieved from the internet Oct. 22, 2018>. (Year: 2016).*

Bouda, Martin, et al. "Accurate prediction of quality of transmission with dynamically configurable optical impairment model." Optical Fiber Communications Conference and Exhibition (OFC), 2017. IEEE, 2017; 3 pages, 2017.

Vassilieva, Olga, et al. "Interplay between PDL and nonlinear effects in coherent polarization multiplexed systems." Optics express 19.26 (2011): B357-B362; 6 pages, 2011.

(Continued)

*Primary Examiner* — Nathan M Cors
(74) *Attorney, Agent, or Firm* — Baker Botts L.L.P.

(57) ABSTRACT

A method for VON service with guaranteed availability may use probability density functions (PDF) of Q-factor to determine availability of physical links assigned to a virtual link in the VON. Then, a VON mapping may be performed based on the determined availabilities, among other factors.

22 Claims, 6 Drawing Sheets

(56) References Cited

OTHER PUBLICATIONS

Kong, Jian, et al. "Availability-guaranteed virtual optical network mapping with shared backup path protection." Global Communications Conference (GLOBECOM), 2016 IEEE. IEEE, 2016; 6 pages, 2016.

Antony, Tony, et al. "WDM Network Design." Retrieved from <http://www.ciscopress.com/articles/article.asp?p=30886&seqNum=5>, Feb. 7, 2003; 4 pages, Feb. 7, 2003.

Chakma, Trimita "Optical Signal to Noise Ratio (OSNR)." International University Bremen, 2005; 18 pages, 2005.

* cited by examiner

VON MAPPING

400 — Q-FACTOR AND AVAILABILITY PROBABILITY DENSITY FUNCTIONS (PDF)

VIRTUAL OPTICAL NETWORK SERVICE WITH GUARANTEED AVAILABILITY

BACKGROUND

Field of the Disclosure

The present disclosure relates generally to optical transport networks and, more particularly, to virtual optical network service with guaranteed availability.

Description of the Related Art

Telecommunication, cable television and data communication systems use optical networks to rapidly convey large amounts of information between remote points. In an optical network, information is conveyed in the form of optical signals through optical fibers, also referred to as a lightpath.

One type of service offered with optical networks is optical network virtualization, which may enable network service providers to provision multiple coexisting and isolated virtual optical networks (VONs) over the same physical infrastructure. For example, in conventional optical networks, network services are provided in terms of lightpaths (i.e., optical network paths between given endpoints). Thus, optical network services may be provided in terms of VONs to a customer. When provisioning VONs in response to a request, different mapping patterns for mapping virtual nodes to a physical topology may be possible. Each mapping of a virtual node in a VON to physical node may be associated with a quality of service metric of the links between the nodes. The use of certain quality of service metrics may result in poor spectral efficiency and may not provide meaningful advantages in terms of network reliability.

SUMMARY

In one aspect of VON service with guaranteed availability, a disclosed method includes identifying an optical path that is used to represent a virtual link in a virtual optical network (VON), including identifying potential physical nodes and potential physical links for the optical path. The method may also include determining a minimum availability associated with the virtual link and identifying a plurality of wavelength configurations for the optical path, the wavelength configurations comprising a modulation format, a forward error correction (FEC) ratio, a baud rate, and a launch optical power of an optical signal transmitted over the optical path. The method may further include determining a probability density function (PDF) for an optical signal-to-noise ratio (OSNR) for the optical path, and, based on the PDF for the OSNR, respectively determining a PDF for a Q-factor for each of the wavelength configurations. The method may still further include, from the PDFs for the Q-factor, respectively determining a calculated availability for each of the wavelength configurations using an integral of the PDF over the Q-factor. The method may further include selecting a first wavelength configuration from the wavelength configurations using the calculated availability, and sending instructions to a transmitter and a receiver for the optical path to implement the wavelength configuration for the optical signal.

In any of the disclosed implementations of the method, determining the PDF for the OSNR may further include measuring optical performance of network traffic transmitted over the optical path to calculate a second PDF for a Q-factor corresponding to a second wavelength configuration for the optical path, and using the second PDF for the Q-factor for determining the PDF for the OSNR.

In any of the disclosed implementations of the method, determining the PDF for the OSNR may further include using an analytical model of the optical path to estimate a second PDF for a Q-factor corresponding to a second wavelength configuration for the optical path, and using the second PDF for the Q-factor for determining the PDF for the OSNR.

In any of the disclosed implementations, the method may include measuring optical performance of network traffic transmitted over the optical path to calculate a third PDF for a Q-factor corresponding to the first wavelength configuration for the optical path, and using the third PDF for the Q-factor for updating the PDF for the OSNR.

In any of the disclosed implementations of the method, respectively determining the calculated availability for each of the wavelength configurations using an integral of the PDF over the Q-factor may further include determining the calculated availability from a threshold Q-factor, wherein the calculated availability is given by the integral from the threshold Q-factor to infinity.

In any of the disclosed implementations of the method, selecting the first wavelength configuration may further include selecting the first wavelength according to the calculated availability.

In any of the disclosed implementations of the method, selecting the first wavelength configuration may further include selecting the first wavelength according to a cost function based on a metric for each of the wavelength configurations.

Additional disclosed aspects of VON service with guaranteed availability include a network management system enabled to implement the method, and an optical transport network including the network management system.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
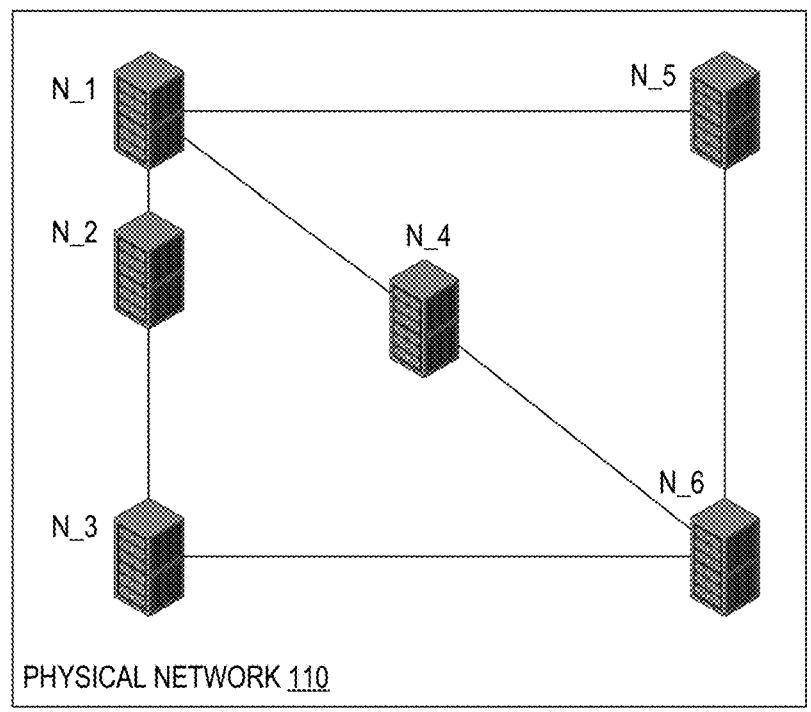
FIG. 1 is a depiction of a virtual optical network mapping to a physical network.
Figure 1:
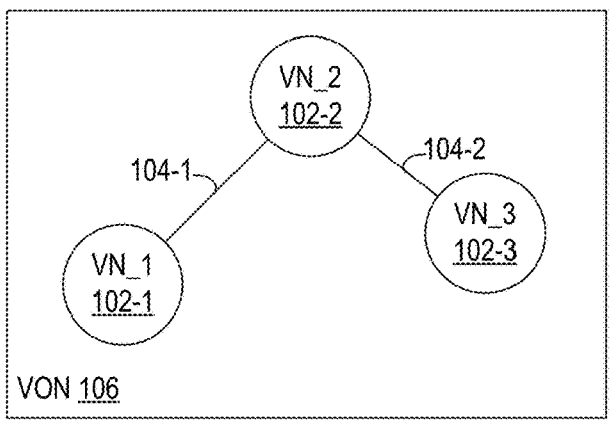
Figure 1:
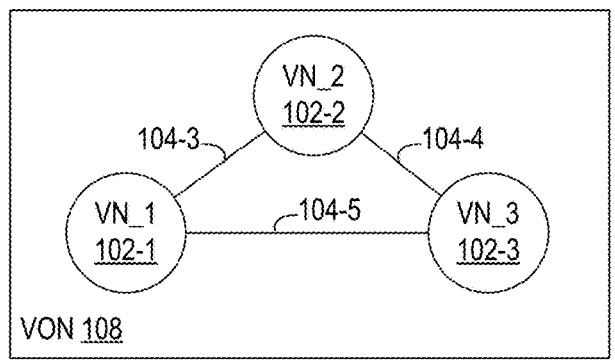

In the following description, details are set forth by way of example to facilitate discussion of the disclosed subject matter. It should be apparent to a person of ordinary skill in the field, however, that the disclosed implementations are exemplary and not exhaustive of all possible implementations.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Turning now to the drawings, FIG. 1 illustrates an example of a virtual optical network (VON) mapping 100 of a VON 106 to a physical network 110. FIG. 1 is an example depicted for descriptive purposes. It will be understood that VON mappings, as disclosed herein, may be implemented for different sizes and complexities of both VONs and physical networks. In VON mapping 100, physical network 110 is shown comprising six physical nodes, N_1, N_2, N_3, N_4, N_5, and N_6. Additionally, physical network 110 includes links between individual nodes that represent an actual physical network topology. In different implementations, physical nodes in physical network 110 may represent certain network infrastructure, such as data centers or other information technology (IT) infrastructure that relies upon the physical links for communication between the physical nodes. Furthermore, physical network 110 may correspond to a particular physical area, such as a metropolis, a region, a county, a state, or other areas.

In FIG. 1, VON 106 may represent a virtual optical network that is provided to a customer as a telecommunications service. Accordingly, VON 106 may represent a combination of network products and network services provided to a customer by a network provider, such as a network provider associated with physical network 110. As shown, VON 106 comprises three virtual nodes (VN) 102, namely VN_1 102-1, VN_2 102-2, and VN_3 102-3, as well as virtual link 104-1 between VN_1 102-1 and VN_2 102-2, and virtual link 104-2 between 102-2 and VN_3 102-3.

In FIG. 1, VON 108 may represent another virtual optical network that is provided to a customer as a telecommunications service. Accordingly, VON 108 may represent a combination of network products and network services provided to a customer by a network provider, such as a network provider associated with physical network 110. As shown, VON 108 comprises three virtual nodes VN_1 102-1, VN_2 102-2, and VN_3 102-3, as well as virtual link 104-3 between VN_1 102-1 and VN_2 102-2, virtual link 104-4 between 102-2 and VN_3 102-3, and virtual link 104-5 between VN_1 102-1 and VN_3 102-3.

In order to facilitate VON mapping 100, a VON may be selected based on requested features of the telecommunication service, such as between VON 106 and VON 108. Then, each of the virtual nodes 102 in the selected VON may be mapped to one of the physical nodes in physical network 110, while virtual links 104 may represent physical links (and certain physical nodes) between the mapped physical nodes. Depending on the topologies used for VON mapping 100, virtual node 102 may be selected from one or more of the physical nodes. In other words, virtual node 102 may be associated with at least one candidate physical node for VON mapping 100 (see also FIG. 5).

Figure 2:
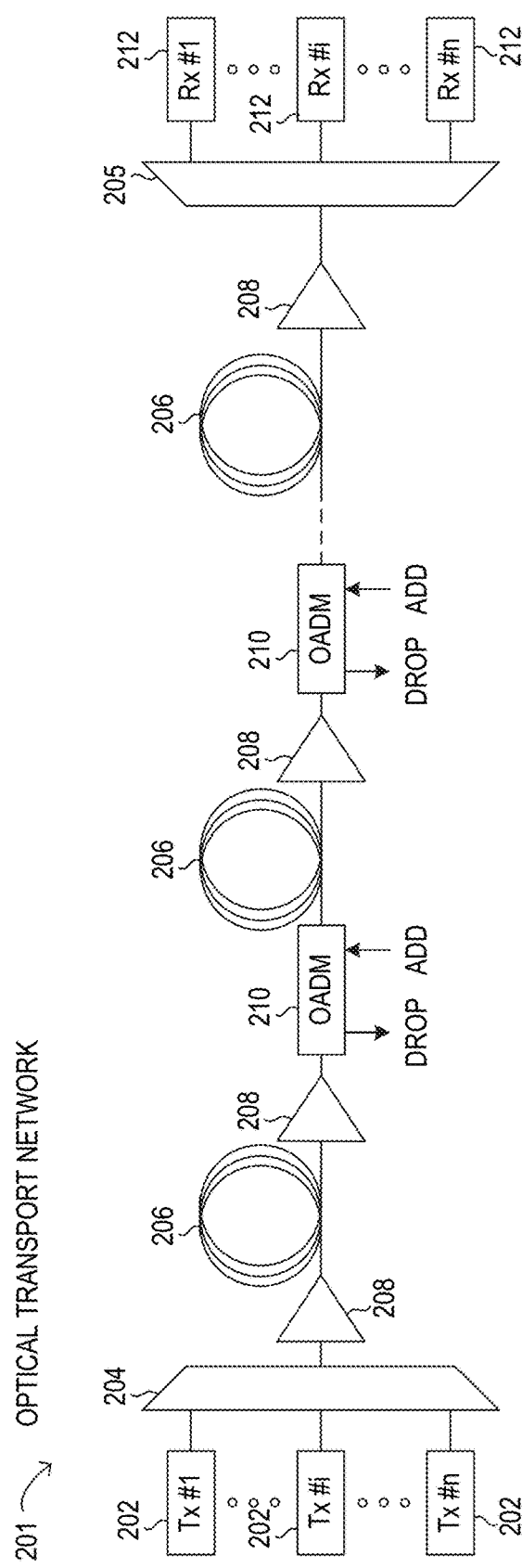
FIG. 2 is a depiction of selected elements of an implementation of an optical transport network.

FIG. 2 illustrates an example implementation of optical transport network (OTN) 201, which may represent an optical communication system. In particular, optical transport network 201 may represent an implementation of physical network 110 in FIG. 1, or a portion thereof. Optical transport network 201 includes one or more optical fibers 206 to transport one or more optical signals communicated by components of optical transport network 201. The network elements of optical transport network 201, coupled together by fibers 206, may comprise one or more transmitters (Tx) 202, one or more multiplexers (MUX) 204, one or more optical amplifiers 208, one or more optical add/drop multiplexers (OADM) 210, one or more demultiplexers (DEMUX) 205, and one or more receivers (Rx) 212.

Optical transport network 201 may comprise a point-to-point optical network with terminal nodes, a ring optical network, a mesh optical network, or any other suitable optical network or combination of optical networks. Optical transport network 201 may be used in a short-haul metropolitan network, a long-haul inter-city network, or any other suitable network or combination of networks. The capacity of optical transport network 201 may include, for example, 100 Gbit/s, 400 Gbit/s, or 1 Tbit/s. Optical fibers 206 comprise thin strands of glass capable of communicating the signals over long distances with very low loss. Optical fibers 206 may comprise a suitable type of fiber selected from a variety of different fibers for optical transmission. Optical fibers 206 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 201 may include devices to transmit optical signals over optical fibers 206. Information may be transmitted and received through optical transport network 201 by modulation of one or more wavelengths of light to encode the information on the wavelength. In optical networking, a wavelength of light may also be referred to as a "channel" that is included in an optical signal. Each channel may carry a certain amount of information through optical transport network 201.

To increase the information capacity and transport capabilities of optical transport network 201, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 201 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular implementations, Nyquist wavelength-division multiplexing (N-WDM) may be used in a superchannel. In N-WDM, optical pulses having a nearly rectangular spectrum are packed together in the frequency domain with a bandwidth approaching the baud rate (see also FIG. 2).

Optical transport network 201 may include one or more optical transmitters (Tx) 202 to transmit optical signals through optical transport network 201 in specific wavelengths or channels. Transmitters 202 may comprise a system, apparatus or device to convert an electrical signal into an optical signal and transmit the optical signal. For example, transmitters 202 may each comprise a laser and a modulator to receive electrical signals and modulate the information contained in the electrical signals onto a beam of light produced by the laser at a particular wavelength, and transmit the beam for carrying the signal throughout optical transport network 201. In some implementations, optical transmitter 202 may be used to determine the baud rate for the data to be transmitted during the optical modulation. An example of transmitter 202 for applying different baud rates is an adaptive rate transponder. Additionally, a forward error correction (FEC) module may be included in optical transmitter 202, or may be used in conjunction with optical transmitter 202. The FEC module may process the electrical signal carrying the information or data to be transmitted to include error correction codes. The FEC module at transmitter 202 may also determine a baud rate for sending the data to be transmitted to optical transmitter 202 for optical modulation.

Multiplexer 204 may be coupled to transmitters 202 and may be a system, apparatus or device to combine the signals transmitted by transmitters 202, e.g., at respective individual wavelengths, into a WDM signal.

Optical amplifiers 208 may amplify the multi-channeled signals within optical transport network 201. Optical amplifiers 208 may be positioned before and after certain lengths of fiber 206, which is referred to as "in-line amplification". Optical amplifiers 208 may comprise a system, apparatus, or device to amplify optical signals. For example, optical amplifiers 208 may comprise an optical repeater that amplifies the optical signal. This amplification may be performed with opto-electrical or electro-optical conversion. In some implementations, optical amplifiers 208 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 208 may comprise an erbium-doped fiber amplifier (EDFA). However, any other suitable amplifier, such as a semiconductor optical amplifier (SOA), may be used.

OADMs 210 may be coupled to optical transport network 201 via fibers 206. OADMs 210 comprise an add/drop module, which may include a system, apparatus or device to add and drop optical signals (i.e., at individual wavelengths) from fibers 206. After passing through an OADM 210, an optical signal may travel along fibers 206 directly to a destination, or the signal may be passed through one or more additional OADMs 210 and optical amplifiers 208 before reaching a destination. In this manner, OADMs 210 may enable connection of different optical transport network topologies together, such as different rings and different linear spans.

In certain implementations of optical transport network 201, OADM 210 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 205. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain implementations, optical transport network 201 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 201, ROADM 210 may be capable of adding or dropping individual or multiple wavelengths of a WDM, DWDM, or superchannel signal carrying data channels to be added or dropped in the optical domain. In certain implementations, ROADM 210 may include or be coupled to a wavelength selective switch (WSS).

As shown in FIG. 2, optical transport network 201 may also include one or more demultiplexers 205 at one or more destinations of network 201. Demultiplexer 205 may comprise a system apparatus or device that acts as a demultiplexer by splitting a single composite WDM signal into individual channels at respective wavelengths. For example, optical transport network 201 may transmit and carry a forty (40) channel DWDM signal. Demultiplexer 205 may divide the single, forty channel DWDM signal into forty separate signals according to the forty different channels. It will be understood that different numbers of channels or subcarriers may be transmitted and demultiplexed in optical transport network 201, in various implementations.

In FIG. 2, optical transport network 201 may also include receivers 212 coupled to demultiplexer 205. Each receiver 212 may receive optical signals transmitted at a particular wavelength or channel, and may process the optical signals to obtain (demodulate) the information (data) that the optical signals contain. Accordingly, network 201 may include at least one receiver 212 for every channel of the network. As shown, receivers 212 may demodulate the optical signals according to a baud rate used by transmitter 202. In some implementations, receiver 212 may include, or may be followed by, a forward error correction (FEC) module to use the error correction codes to check the integrity of the received data. The FEC module may also correct certain errors in the data based on the error correction codes. The FEC module at receiver 212 may also demodulate the data at a specific baud rate defined for each channel at transmitter 202, as described above.

Optical networks, such as optical transport network 201 in FIG. 2, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried with better spectral efficiency. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain implementations, optical transport network 201 may transmit a superchannel, in which a plurality of sub-carriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 201 as one entity. The subcarriers within the superchannel may be tightly packed to achieve high spectral efficiency.

In an optical network, such as optical transport network 201 in FIG. 2, it is typical to refer to a management plane, a control plane, and a transport plane (sometimes called the physical layer). A central management host (see also FIG. 3) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 201 without departing from the scope of the disclosure. For example, optical transport network 201 may include more or fewer elements than those depicted in FIG. 2. Also, as mentioned above, although depicted as a point-to-point network, optical transport network 201 may comprise any suitable network topology for transmitting optical signals such as a ring, a mesh, or a hierarchical network topology.

In operation, optical transport network 201 in FIG. 2 may be used to implement physical network 110 shown in FIG. 1. Accordingly, certain nodes included with optical transport network 201 may represent physical nodes that can be mapped to virtual nodes 102 of a desired VON, such as VON 106 or 108 as shown in VON mapping 100, or any in other desired VON mapping for a customer. A customer that is provided VON mapping 100 may also be provided with a choice of different levels of network service, such as different levels of quality of service (QoS) associated with VON 106. One aspect of QoS for a customer of VON 106 may be a so-called "availability" or a of each virtual link in VON 106. The availability a for a physical link is given by Equation 1:

$$a = \frac{MTTF}{MTTF + MTTR} \quad \text{Equation 1}$$

In Equation 1, MTTF is a mean time to failure for the physical link, and MTTR is a mean time to repair for the physical link.

For example, considering VON 108, the total availability of a network comprising three physical links A, B, and C (corresponding to virtual links 104-3, 104-4, and 104-5 in VON 108), the aggregate availability of the network $a_N$ (e.g. VON 108) is simply the product of the individual link availabilities, $a_A$, $a_B$, $a_C$, as given by Equation 2.

$$a_N = a_A a_B a_C \quad \text{Equation 2}$$

As noted, Equation 2 assumes that all physical links should be available. If one physical link in the same network is allowed to fail, the aggregate availability of the network $a_N$ is given by Equation 3.

$$a_N = a_A a_B a_C + (1-a_A) a_B a_C + a_A (1-a_B) a_C + a_A a_B (1-a_C) \quad \text{Equation 3}$$

Thus, availability of a VON may be an important aspect of QoS for the VON service being provided. Additional aspects of QoS may include error rates and transmission throughput rates (baud rates), which may represent additional or higher levels of network service. Conventional methods of VON mapping may assign large amounts of network resources to meet a QoS criteria, and in particular, may consume large amounts of the available optical spectrum for this purpose. However, availability of the VON may be a primary aspect that is valuable for a customer that uses VON services from a provider.

Additional performance metrics (or quality metrics) associated with a physical link, such as an optical path, may include optical signal-to-noise ratio (OSNR) and quality factor (Q-factor or Q). For a WDM signal having a linear optical signal power S and a linear optical noise power $N_{Bo}$ in a given optical bandwidth (Bo~12.48 GHz), the OSNR is given in decibels by Equation 4.

$$OSNR \text{ [dB]} = 10 \log_{10}\left(\frac{S}{N_{Bo}}\right) \quad \text{Equation 4}$$

Using Equation 4, OSNR may be accordingly measured for a given optical network, or more specifically, for a given optical path. The SNR in decibels may be calculated in decibels from OSNR using Equation 5.

$$SNR \text{ [dB]} = OSNR + 10 \log_{10}\left(\frac{B_o}{B_C}\right) \quad \text{Equation 5}$$

In Equation 5, $B_O$ is an optical bandwidth of 12.48 GHz while $B_C$ is an electrical bandwidth of the received signal or baud rate. If SNR is known, a BER can be calculated depending on a modulation format. For example, the BER of DP-QPSK and DP-16QAM can be found using the following Equations 6 and 7, respectively.

$$BER_{DP-QPSK} = 0.5 \, \text{erfc}(\sqrt{SNR/2}) \quad \text{Equation 6}$$

$$BER_{DP-16QAM} = \tfrac{3}{8} \text{erfc}(\sqrt{SNR/10}) \quad \text{Equation 7}$$

In equations 6 and 7, SNR is in linear scale and erfc is the complementary error function. Then, BER may be converted to Q-factor using the following Equation 8.

$$Q \text{ factor[dB]} = 20 \log_{10}(\sqrt{2} \, \text{erfc}^{-1}(2BER)) \quad \text{Equation 8}$$

Because the Q-factor is dependent upon the modulation format and the baud rate, the Q-factor is dependent upon a wavelength configuration of the optical signal. However, with knowledge of the bandwidths $B_O$ and $B_C$, which can be ascertained from the wavelength configuration, OSNR may be calculated from Q and vice-versa, as given by Equations 4-8. It is noted that OSNR is not dependent on modulation format and may be calculated for an optical path using an analytical model such as the Gaussian noise (GN) model. As used herein, "wavelength configuration" refers to characteristics of the optical signal that can be selected for transmission and may comprise at least one of a modulation format, a forward error correction (FEC) ratio, a baud rate, and a launch optical power of the optical signal transmitted over an optical path.

Furthermore, the process of selecting a desired or optimal wavelength configuration from possible wavelength configurations for a given VON may further utilize a cost function for weighting certain factors or aspects, such as in order to satisfy a particular goal or priority for operating optical transport network 201, or portions thereof. The cost function may be based on some metric associated with the given VON related to optical network performance, such as spectral efficiency, data rate, number of spectral slots, or network resource consumption, among other possible metrics.

In one example application of the cost function, data rates for virtual links 104-3, 104-4, and 104-5 in VON 108, may be used. Table 1 shows values for two cases of availability for VON 108, where virtual links 104-3, 104-4, and 104-5 in VON 108 are noted as A, B, and C, respectively. Case 1 may represent a first wavelength configuration, while case 2 may represent a second wavelength configuration. In this example, VON 108 is considered as failing when at least 2 virtual links fail at the same time, while VON availability in Table 1 is calculated using Equation 3. For example, if a threshold for VON availability is 0.999, then both case 1 and case 2 satisfy this threshold.

TABLE 1

Two cases of data rate for a cost function using VON 108

| Parameter | Case 1 | Case 2 |
|---|---|---|
| $a_A$ | 0.99999 | 0.99999 |
| $a_B$ | 0.99999 | 0.99999 |
| $a_C$ | 0.30000 | 0.99999 |
| $R_A$ | 200 Gb/s | 200 Gb/s |
| $R_B$ | 200 Gb/s | 200 Gb/s |
| $R_C$ | 400 Gb/s | 200 Gb/s |
| VON availability | 0.99986 | 1.000 |
| Aggregate Data Rate (ADR) | 800 Gb/s | 600 Gb/s |
| Time Averaged ADR (TAADR) | 519.96 Gb/s | 599.94 Gb/s |

In Table 1, $R_i$ is a data rate for a virtual link i, while $ADR = \Sigma_i R_i$, and $TAADR = \Sigma_i a_i R_i$. Table 1 shows that the wavelength configuration in case 1 has a higher ADR, but a lower TAADR. Thus, the second wavelength configuration may be selected when, for example, TAADR is the metric used for the cost function to weight the different possible wavelength configurations. TAADR is a metric indicating an actual throughput of a VON for a normalized period of time.

In another example, a spectral efficiency (SE) may be used as the metric for the cost function for virtual links 104-3, 104-4, and 104-5 in VON 108, noted as A, B, and C, respectively. Table 2 shows values for two cases of availability for VON 108, similar to the values shown in Table 1.

TABLE 2

Two cases of spectral efficiency for a cost function using VON 108

| Parameter | Case 1 | Case 2 |
|---|---|---|
| $a_A$ | 0.99999 | 0.99999 |
| $a_B$ | 0.99999 | 0.99999 |
| $a_C$ | 0.30000 | 0.99999 |
| $SE_A$ | 8 bit/s/Hz | 8 bit/s/Hz |
| $SE_B$ | 8 bit/s/Hz | 8 bit/s/Hz |
| $SE_C$ | 16 bit/s/Hz | 8 bit/s/Hz |
| VON availability | 0.99986 | 1.000 |
| Average Spectral Efficiency (ASE) | 10.667 bit/s/Hz | 8 bit/s/Hz |
| Time Averaged SE (TASE) | 6.9328 bit/s/Hz | 7.9992 bit/s/Hz |

In Table 2, $SE_i$ is a spectral efficiency for a virtual link i, while $$ASE = \sum_i \frac{R_i}{N}, \quad \text{and} \quad TASE = \sum_i a_i \frac{SE_i}{N},$$

where N is the number of virtual links. Table 2 shows that the wavelength configuration in case 1 has a higher SE, but a lower TASE. Thus, the wavelength configuration in case 2 may be selected when, for example, TASE is the metric used for the cost function to weight the different possible wavelength configurations. In addition to the examples of data rate and spectral efficiency as metrics used for the cost function, other metrics such as a number spectral slots to support a given data rate may be used in different implementations.

As will be disclosed in further detail herein, VON mapping of physical network resources may be provided with guaranteed availability of the virtual links in the VON. The VON service with guaranteed availability disclosed herein may enable a VON mapping based on estimated performance metrics, such as Q-factor and OSNR, of the physical links for mapping to the virtual links. The VON service with guaranteed availability disclosed herein may enable a VON mapping based on monitoring of performance metrics, such as Q-factor and OSNR, for an optical path that comprises a physical link for mapping to a virtual link. In this manner, the VON service with guaranteed availability disclosed herein may enable optimization of network performance and network resource utilization, such as spectrum utilization.

The VON service with guaranteed availability disclosed herein may identify sets of source-destination virtual nodes for VON mapping. Then, for each source-destination virtual node pair defining a virtual link, candidate optical paths in the physical network may be identified for VON mapping. Then, for each optical path in the physical network, a probability density function (PDF) of Q may be determined. The PDF comprises a probability function (e.g. a histogram) for different individual values of Q that are observed. The PDF of Q may be determined based on empirical monitoring of the optical path when actual traffic is transmitted over the optical path. In some instances, the PDF of Q may be determined based on an analytical model of traffic being transmitted over the optical path, such as a Monte Carlo simulation model. From the PDF of Q, the availability a of the optical path may be determined.

From the PDF of Q for the optical path, which is dependent on the wavelength configuration of the optical path, a PDF of OSNR for the optical path may be calculated, which is not dependent on the wavelength configuration of the optical path. Then, various different potential wavelength configurations of the optical path may be evaluated, including calculating a respective availability for each of the wavelength configurations of the optical path. Then, based on the values of the availability for the wavelength configurations of the optical path, one of the wavelength configurations may be selected, for example, based on a desired availability, among other factors such as spectral efficiency, spectral slot position, and number of physical links. Additionally, a cost function for a desired metric of the wavelength configuration may be used as a weighting to promote or favor a particular goal of network operation related to the metric, such as data rate or spectral efficiency, among other metrics.

The selected wavelength configuration for the optical path may then be implemented for the optical path to enable VON service based on the VON mapping. The implementation of the wavelength configuration may comprise sending instructions to transmitter 202 and receiver 212 for the optical path. In various implementations, transmitter 202 and receiver 212 are universal transponders that can be programmed for different wavelength configurations. In this manner, a finer granularity of spectral efficiency and availability for each virtual link in the VON may be achieved, as compared to conventional methods, such as using a fixed receiver margin of about 2 dB as described above.

Figure 3:
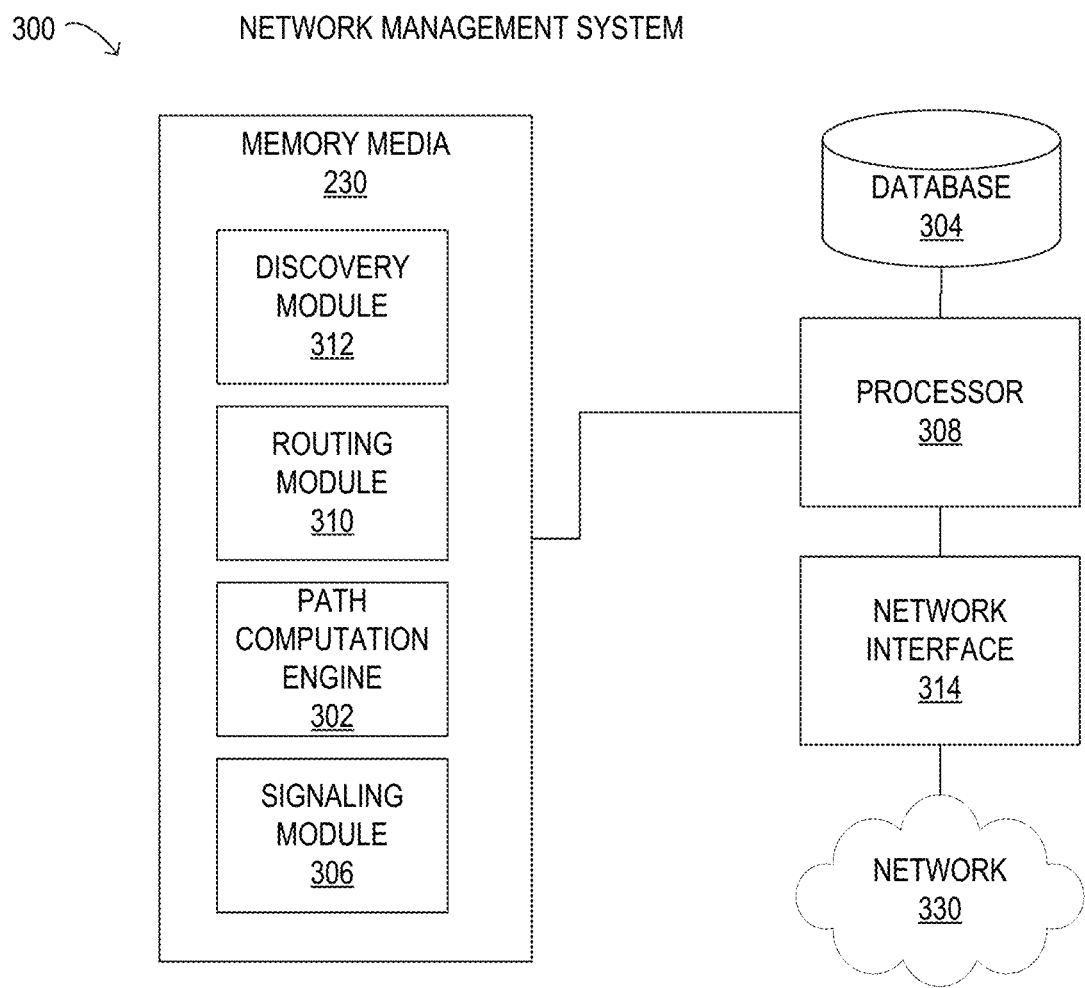
FIG. 3 is a depiction of selected elements of an implementation of an optical network management system.

Referring now to FIG. 3, a block diagram of selected elements of an implementation of network management system 300 for implementing control plane functionality in optical networks, such as, for example, in optical transport network 101 (see FIG. 1), is illustrated. Furthermore, it is noted that network management system 300 may function as, or may further include, a software-defined networking (SDN) controller. A control plane may include functionality for network intelligence and control and may comprise applications that support the ability to establish network services, including applications or modules for discovery, routing, path computation, and signaling, as will be described in further detail. In particular, network management system 300 may represent at least certain portions of a control system used to implement virtual optical network service with guaranteed availability, as disclosed herein. For example network management system 300 may send appropriate commands to transmitter 202 and receiver 212 to implement a wavelength configuration, perform monitoring of the optical signal, as well as other operations disclosed herein.

In FIG. 3, the control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some implementations, network interface 314 may be communicatively coupled via network 330 to a network storage resource. In some implementations, network 330 represents at least certain portions of optical transport network 101. Network 330 may also include certain portions of a network using galvanic or electronic media. In certain implementations, network 330 may include at least certain portions of a public network, such as the Internet. Network 330 may be implemented using hardware, software, or various combinations thereof.

In certain implementations, network management system 300 may be configured to interface with a person (a user) and receive data about the optical signal transmission path. For example, network management system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 300 may be configured to receive data about the optical signal transmission path from a device such as another computing device or a network node, for example via network 330.

As shown in FIG. 3, in some implementations, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some implementations, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular implementations, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various implementations, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical transport network 101. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different implementations, signaling module 306 may employ a signaling protocol to propagate subsequent communication to and from nodes along the network path.

In operation, the modules of network management system 300 may implement various aspects of the VON service with guaranteed availability disclosed herein. For example, instructions stored in memory media 230 of network management system 300, such as path computation engine 302 or other modules, may be used to generate VON mappings and to evaluate candidate optical paths for different wavelength configurations. Additionally, instructions stored in memory media 230 of network management system 300, such as signaling module 306 or other modules, may implement a selected wavelength configuration by communicating with and programming transmitter 202 and receiver 212 according to the selected wavelength configuration. Other instructions stored in memory media 230 may be used for monitoring of the optical path or for generating and using an analytical model of the optical path.

Figure 4:
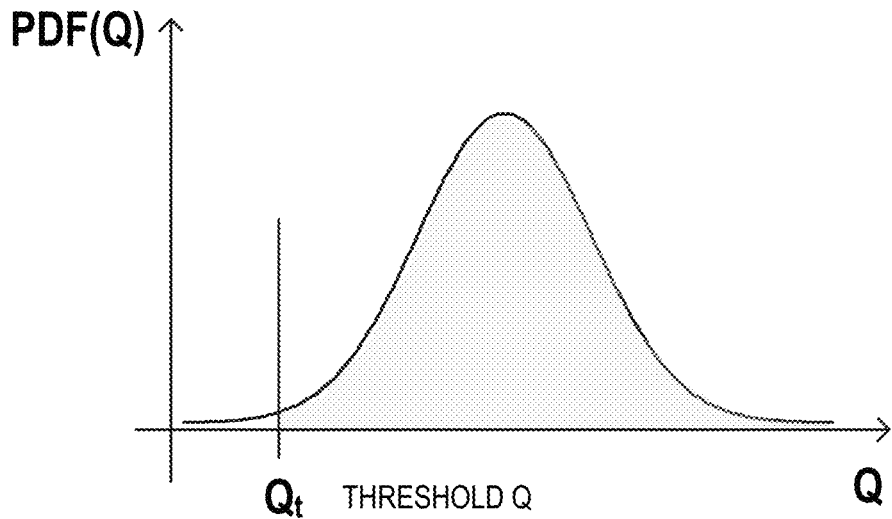
FIG. 4 depicts plots of Q-factor and availability probability density functions (PDF)
Figure 4:
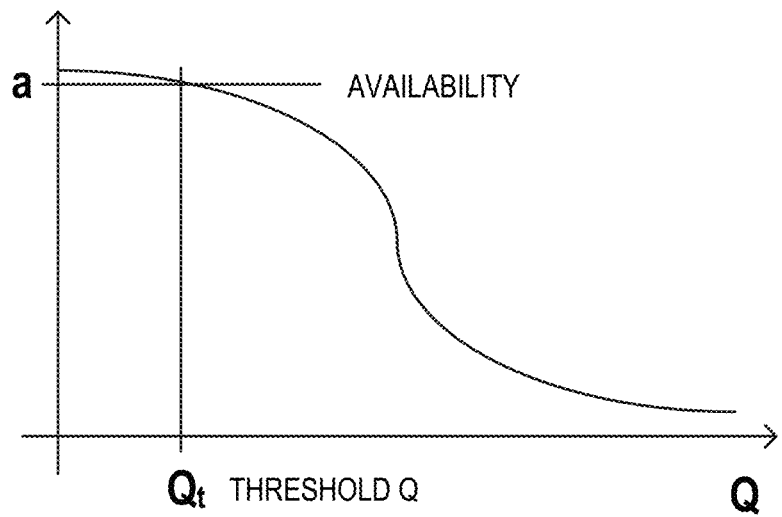

FIG. 4 depicts plots of a probability density function (PDF) of Q-factor 400. The PDF of Q-factor for a given optical path may be obtained by monitoring the performance of existing optical traffic. If there is no existing traffic, then the PDF of OSNR can be generated by stochastic simulation based on an analytical model (for example the Gaussian Noise model) for the optical transmission system. Then, the PDF of OSNR can be converted to the PDF of Q-factor depending on a modulation format. In FIG. 4, the top plot shows PDF(Q) versus Q and results in a distribution function, such as a Gaussian function or similar distribution function. In the PDF(Q) plot, a threshold Q ($Q_t$) value is shown and represent a minimum value of Q, which guarantees error free operation with forward error correction (FEC). It is noted that $Q_t$ is determined by an FEC overhead ratio and coding. The probability of error free operation for this particular PDF of Q-factor can be calculated by integrating the area of PDF above $Q_t$, which represents a certain level of quality of service for a given optical path.

In the lower plot of FIG. 4, the integral of PDF(Q) from Q to infinity is shown versus Q. Also shown in the lower plot is a marker at $Q_t$, from which the availability a can be calculated from the integral as given by Equation 9.

$$a = \int_{Q_t}^{\infty} PDF(Q) dQ \qquad \text{Equation 9}$$

Accordingly, when the PDF(Q) for an optical path having a given wavelength configuration can be determined, the availability a for the optical path for the given wavelength configuration can be calculated. Conversely, given a desired availability a, a corresponding candidate wavelength configuration (modulation format, baud rate, FEC ratio, etc.) may be determined by evaluating availability based on integration of PDF(Q) over Q. Furthermore, it is noted that the PDF of OSNR may be calculated from the PDF(Q) using Equation 5, which corresponds to a particular wavelength configuration of the optical path. Then, from the PDF of OSNR for the optical path, a PDF(Q), and correspondingly availability a, can be calculated for any desired wavelength configuration, for example, in order to evaluate different wavelength configurations, as shown below in FIG. 5.

Figure 5:
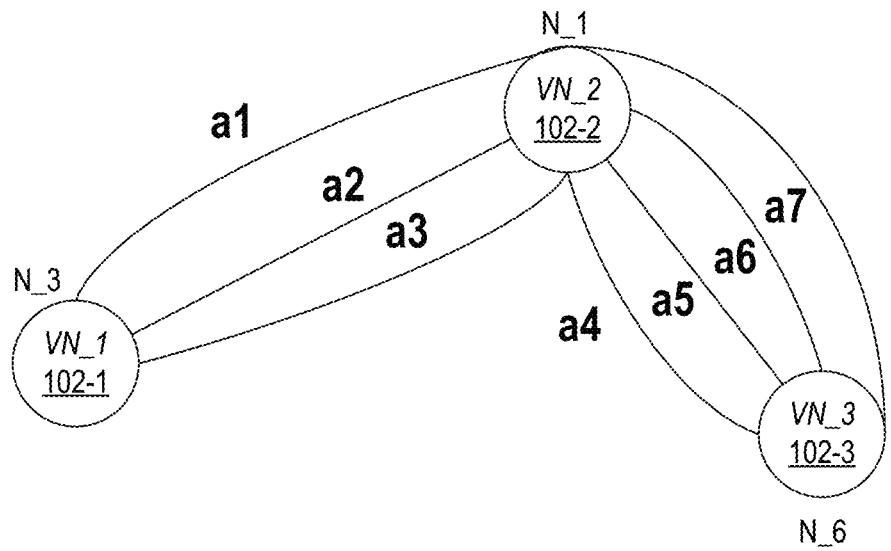
FIG. 5 is a depiction of selected elements of an implementation of a virtual optical network auxiliary graph.
Figure 5:
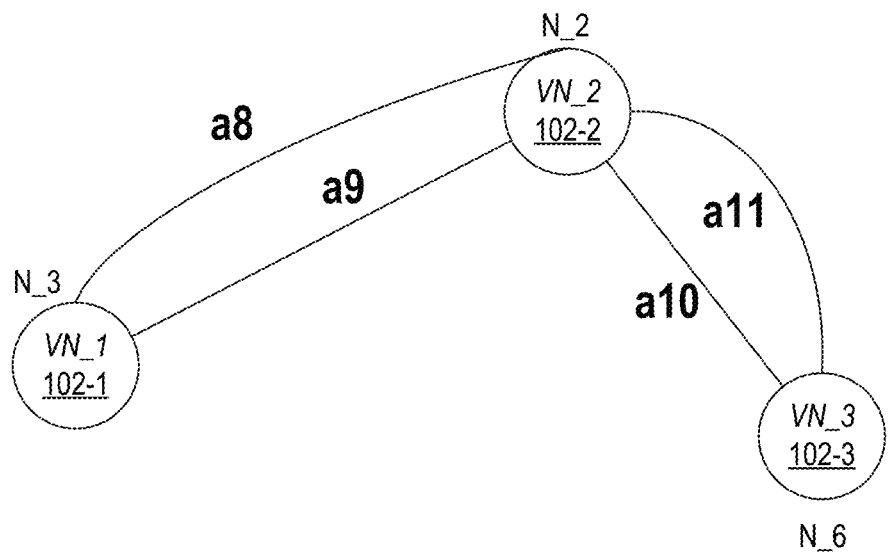

Referring now to FIG. 5, selected elements of an implementation of a VON auxiliary graph 500 is depicted. VON auxiliary graph 500 in FIG. 5 is based on VON mapping 100 in FIG. 1. In any given VON mapping, there might be multiple physical node candidates for a virtual node, and there might be multiple physical link or route candidates for each virtual path between virtual node pairs. To create a VON auxiliary graph, potential sets of virtual nodes and virtual links are first identified. Then for each source-destination node pair in the sets of virtual nodes, potential physical links between physical nodes are determined.

As shown in FIG. 5, VON auxiliary graph 500 is based on VON mapping 100. Specifically, two cases of mapping are identified for VON 106 in FIG. 5 using physical network 110, as shown in Table 3.

TABLE 3

Two cases of VON mapping in VON auxiliary graph 500

| VIRTUAL NODE | PHYSICAL NODE CASE 1 | PHYSICAL NODE CASE 2 |
|---|---|---|
| VN_1 102-1 | N_3 | N_3 |
| VN_2 102-2 | N_1 | N_2 |
| VN_3 102-3 | N_6 | N_6 |

The two cases of VON mapping are shown as two separate auxiliary graphs in FIG. 5: the top auxiliary graph corresponds to case 1 in Table 3, while the bottom auxiliary graph corresponds to case 2 in Table 3. In VON auxiliary graph 500, different wavelength configurations have been evaluated and a corresponding value of availability a has been determined. In the top auxiliary graph in FIG. 5, three different wavelength configurations corresponding to availabilities a1, a2, a3 are shown as potential virtual links for virtual link 104-1, while four different wavelength configurations corresponding to availabilities a4, a5, a6, a7 are shown as potential virtual links for virtual link 104-2. In the bottom auxiliary graph in FIG. 5, two different wavelength configurations corresponding to availabilities a8, a9 are shown as potential virtual links for virtual link 104-1, while two different wavelength configurations corresponding to availabilities a10, a11 are shown as potential virtual links for virtual link 104-2.

At this point, each potential virtual link in VON auxiliary graph 500 is associated with a value for availability a. The potential virtual links may then be evaluated for selection based on the availability a as well as other parameters related to network resource utilization, which may be specified by the wavelength configuration for each virtual link. For example, a minimum availability may be used to filter the potential virtual links. Then, the remaining potential virtual links may be evaluated on network resource utilization associated with the wavelength configuration, such as spectral efficiency, wavelength slot, and physical link equipment, to select a desired potential virtual link.

In some implementations, a cost function may be applied using a metric to weight the wavelength configurations, in order to satisfy some particular goal or priority, as described previously. With or without the cost function, a wavelength configuration may be selected. After selection, the physical links corresponding to the selected virtual link may be configured according to the wavelength configuration of the selected virtual link for optical transport network transmission, as disclosed herein.

Figure 6:
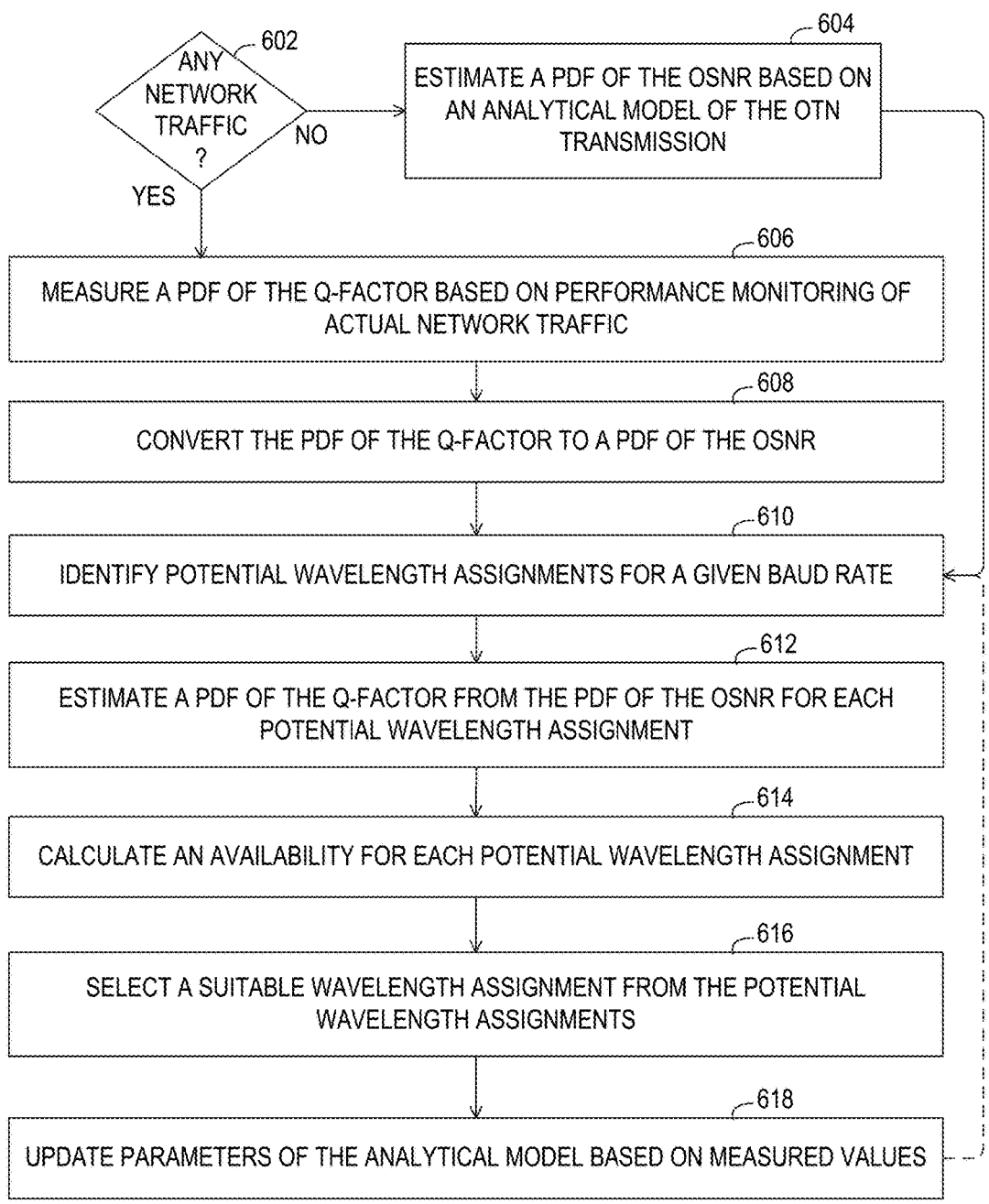
FIG. 6 is a flow chart depicting selected elements of an implementation of a method for virtual optical network service with guaranteed availability.

Referring now to FIG. 6, selected elements of an implementation of method 600 for VON service with guaranteed availability, as described herein, is shown in flow chart format. In various implementations, method 600 may be implemented using optical network 200 and network management system 300 (see FIGS. 2 and 3). It is noted that certain operations depicted in method 600 may be rearranged or omitted, as desired. In particular, method 600 may be performed for a given optical path that is subject to VON mapping as a virtual link.

Method 600 may begin at step 602 with a decision whether any network traffic is transmitted over the optical path. When the result of step 602 is NO and no network traffic is transmitted over the optical path, at step 604, a PDF of the OSNR is estimated based on an analytical model of the OTN transmission. After step 604, method 600 advances to step 610. When the result of step 602 is YES and network traffic is transmitted over the optical path, at step 606, a PDF of the Q-factor is measured based on performance monitoring of actual network traffic. At step 608, the PDF of the Q-factor is converted to a PDF of the OSNR. At step 610, potential wavelength assignments for a given baud rate are identified. At step 612, a PDF of the Q-factor is estimated from the PDF of the OSNR for each potential wavelength assignment. At step 614, an availability for each potential wavelength assignment is calculated. At step 616, a suitable wavelength assignment from the potential wavelength assignments is selected. At step 616, a cost function for a desired metric of the wavelength configuration may be used as a weighting to select a particular wavelength assignment. Step 616 may further comprise implementing the suitable wavelength assignment at the optical path. At step 618, parameters of the analytical model based on measured values is updated. In some implementations, after step 618, method 600 may loop back to step 610, such as when the VON mapping is dynamically updated to reflect evolving network conditions and traffic over the optical path.

As disclosed herein, a method for VON service with guaranteed availability may use probability density functions (PDF) of Q-factor to determine availability of physical links assigned to a virtual link in the VON. Then, a VON mapping may be performed based on the determined availabilities, among other factors.

While the subject of this specification has been described in connection with one or more exemplary implementations, it is not intended to limit any claims to the particular forms set forth. On the contrary, any claims directed to the present disclosure are intended to cover such alternatives, modifications and equivalents as may be included within their spirit and scope.

What is claimed is:

1. A method, comprising:
   identifying an optical path that is used to represent a virtual link in a virtual optical network (VON), including identifying physical nodes and physical links for the optical path;
   determining a minimum availability associated with the virtual link;
   identifying a plurality of wavelength configurations for the optical path, the wavelength configurations comprising a modulation format, a forward error correction (FEC) ratio, a baud rate, and a launch optical power of an optical signal transmitted over the optical path;
   determining a probability density function (PDF) for an optical signal-to-noise ratio (OSNR) for the optical path;
   based on the PDF for the OSNR, respectively determining a PDF for a Q-factor for each of the wavelength configurations;
   from the PDFs for the Q-factor, respectively determining a calculated availability for each of the wavelength configurations using an integral of the PDF over the Q-factor;
   selecting a first wavelength configuration from the wavelength configurations using the calculated availability; and
   sending instructions to a transmitter and a receiver for the optical path to implement the wavelength configuration for the optical signal.

2. The method of claim 1, wherein determining the PDF for the OSNR further comprises:
   measuring optical performance of network traffic transmitted over the optical path to calculate a second PDF for a Q-factor corresponding to a second wavelength configuration for the optical path; and
   using the second PDF for the Q-factor for determining the PDF for the OSNR.

3. The method of claim 1, wherein determining the PDF for the OSNR further comprises:
   using an analytical model of the optical path to estimate a second PDF for a Q-factor corresponding to a second wavelength configuration for the optical path; and
   using the second PDF for the Q-factor for determining the PDF for the OSNR.

4. The method of claim 3, further comprising:
   measuring optical performance of network traffic transmitted over the optical path to calculate a third PDF for a Q-factor corresponding to the first wavelength configuration for the optical path; and
   using the third PDF for the Q-factor for updating the PDF for the OSNR.

5. The method of claim 1, wherein respectively determining the calculated availability for each of the wavelength configurations using an integral of the PDF over the Q-factor further comprises:
   determining the calculated availability from a threshold Q-factor, wherein the calculated availability is given by the integral from the threshold Q to infinity.

6. The method of claim 1, wherein selecting the first wavelength configuration further comprises selecting the first wavelength according to the calculated availability.

7. The method of claim 1, wherein selecting the first wavelength configuration further comprises selecting the first wavelength according to a cost function based on a metric for each of the wavelength configurations.

8. The method of claim 7, wherein the metric is selected from at least one of: a data rate, a spectral efficiency, a time averaged aggregate data rate, and a time averaged spectral efficiency.

9. A network management system, comprising:
   a processor enabled to access a memory media storing instructions executable by the processor for:
   identifying an optical path that is used to represent a virtual link in a virtual optical network (VON), including identifying physical nodes and physical links for the optical path;
   determining a minimum availability associated with the virtual link; identifying a plurality of wavelength configurations for the optical path, the wavelength configurations comprising a modulation format, a forward error correction (FEC) ratio, a baud rate, and a launch optical power of an optical signal transmitted over the optical path;
   determining a probability density function (PDF) for an optical signal-to-noise ratio (OSNR) for the optical path;
   based on the PDF for the OSNR, respectively determining a PDF for a Q-factor for each of the wavelength configurations;
   from the PDFs for the Q-factor, respectively determining a calculated availability for each of the wavelength configurations using an integral of the PDF over the Q-factor;
   selecting a first wavelength configuration from the wavelength configurations using the calculated availability; and
   sending instructions to a transmitter and a receiver for the optical path to implement the wavelength configuration for the optical signal.

10. The network management system of claim 9, wherein determining the PDF for the OSNR further comprises:
    measuring optical performance of network traffic transmitted over the optical path to calculate a second PDF for a Q-factor corresponding to a second wavelength configuration for the optical path; and
    using the second PDF for the Q-factor for determining the PDF for the OSNR.

11. The network management system of claim 9, wherein determining the PDF for the OSNR further comprises:
    using an analytical model of the optical path to estimate a second PDF for a Q-factor corresponding to a second wavelength configuration for the optical path; and
    using the second PDF for the Q-factor for determining the PDF for the OSNR.

12. The network management system of claim 11, further comprising instructions for:
    measuring optical performance of network traffic transmitted over the optical path to calculate a third PDF for a Q-factor corresponding to the first wavelength configuration for the optical path; and
    using the third PDF for the Q-factor for updating the PDF for the OSNR.

13. The network management system of claim 9, wherein respectively determining the calculated availability for each of the wavelength configurations using an integral of the PDF over the Q-factor further comprises:

determining the calculated availability from a threshold Q-factor, wherein the calculated availability is given by the integral from the threshold Q-factor to infinity.

14. The network management system of claim 9, wherein selecting the first wavelength configuration further comprises selecting the first wavelength according to a cost function based on a metric for each of the wavelength configurations.

15. The network management system of claim 14, wherein the metric is selected from at least one of: a data rate, a spectral efficiency, a time averaged aggregate data rate, and a time averaged spectral efficiency.

16. An optical network comprising:

a network management system, further comprising a processor enabled to access a memory media storing instructions executable by the processor for:

identifying an optical path that is used to represent a virtual link in a virtual optical network (VON), including identifying physical nodes and physical links in the optical network for the optical path; determining a minimum availability associated with the virtual link;

identifying a plurality of wavelength configurations for the optical path, the wavelength configurations comprising a modulation format, a forward error correction (FEC) ratio, a baud rate, and a launch optical power of an optical signal transmitted over the optical path;

determining a probability density function (PDF) for an optical signal-to-noise ratio (OSNR) for the optical path;

based on the PDF for the OSNR, respectively determining a PDF for a Q-factor for each of the wavelength configurations;

from the PDFs for the Q-factor, respectively determining a calculated availability for each of the wavelength configurations using an integral of the PDF over the Q-factor;

selecting a first wavelength configuration from the wavelength configurations the calculated availability; and sending instructions to a transmitter and a receiver for the optical path to implement the wavelength configuration for the optical signal.

17. The optical network of claim 16, wherein determining the PDF for the OSNR further comprises:

measuring optical performance of network traffic transmitted over the optical path to calculate a second PDF for a Q-factor corresponding to a second wavelength configuration for the optical path; and using the second PDF for the Q-factor for determining the PDF for the OSNR.

18. The optical network of claim 16, wherein determining the PDF for the OSNR further comprises:

using an analytical model of the optical path to estimate a second PDF for a Q-factor corresponding to a second wavelength configuration for the optical path; and using the second PDF for the Q-factor for determining the PDF for the OSNR.

19. The optical network of claim 18, further comprising instructions for:

measuring optical performance of network traffic transmitted over the optical path to calculate a third PDF for a Q-factor corresponding to the first wavelength configuration for the optical path; and using the third PDF for the Q-factor for updating the PDF for the OSNR.

20. The optical network of claim 16, wherein respectively determining the calculated availability for each of the wavelength configurations using an integral of the PDF over the Q-factor further comprises:

determining the calculated availability from a threshold Q-factor, wherein the calculated availability is given by the integral from the threshold Q-factor to infinity.

21. The optical network of claim 16, wherein selecting the first wavelength configuration further comprises selecting the first wavelength according to a cost function based on a metric for each of the wavelength configurations.

22. The optical network of claim 21, wherein the metric is selected from at least one of: a data rate, a spectral efficiency, a time averaged aggregate data rate, and a time averaged spectral efficiency.

* * * * *